N. C. CHRISTENSEN, Jr.
PROCESS FOR TREATING ORES.
APPLICATION FILED MAR. 10, 1915.

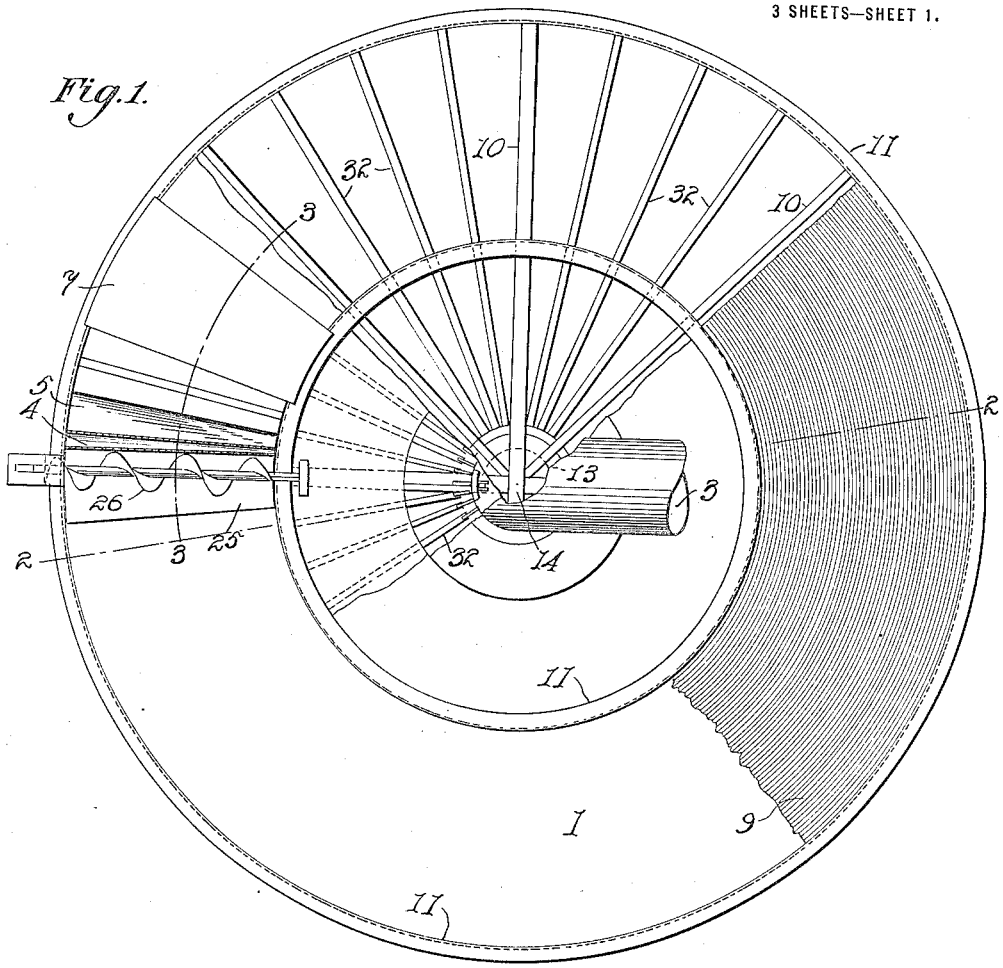
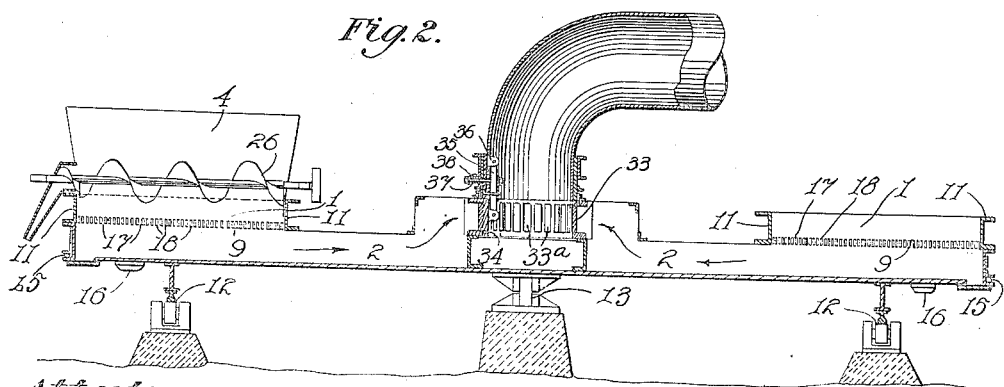

1,239,157.

Patented Sept. 4, 1917.
3 SHEETS—SHEET 2.

Attest:
E. M. Hamilton
Edw. S. Olson

Inventor:
Niels C. Christensen Jr.
by Spear Middleton Donaldson & Spear
Attys.

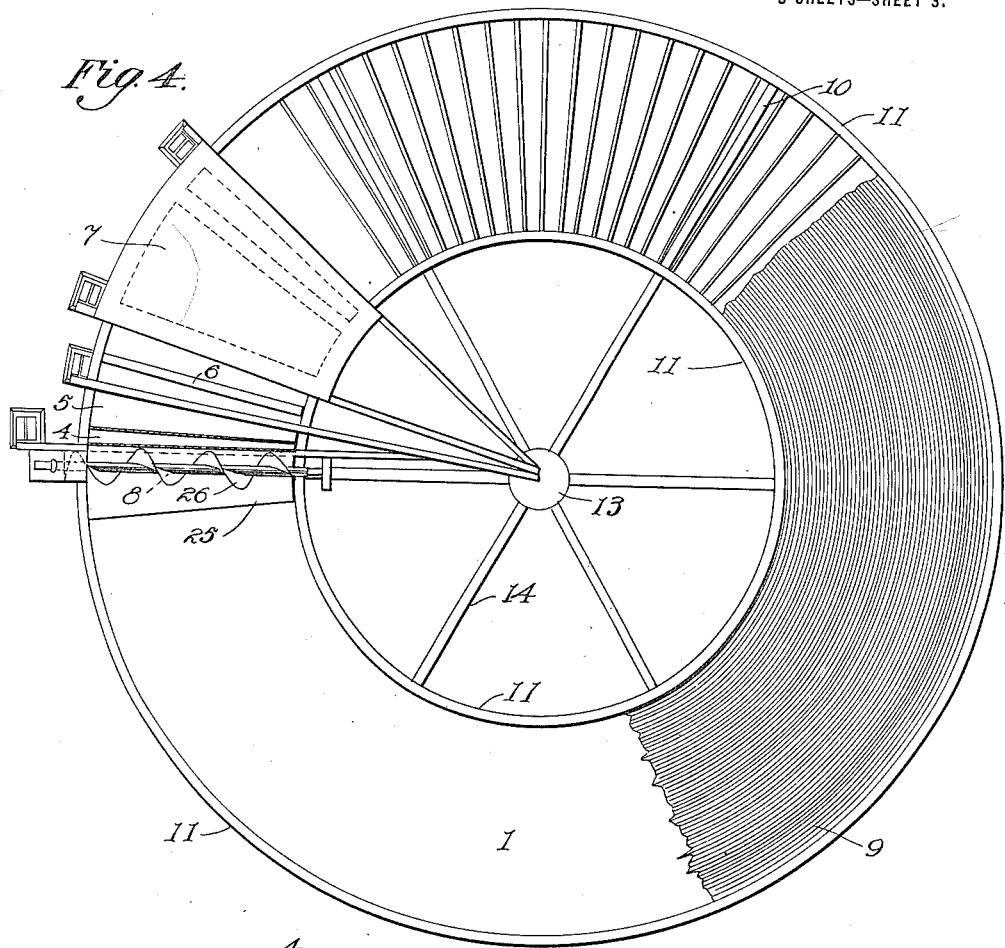
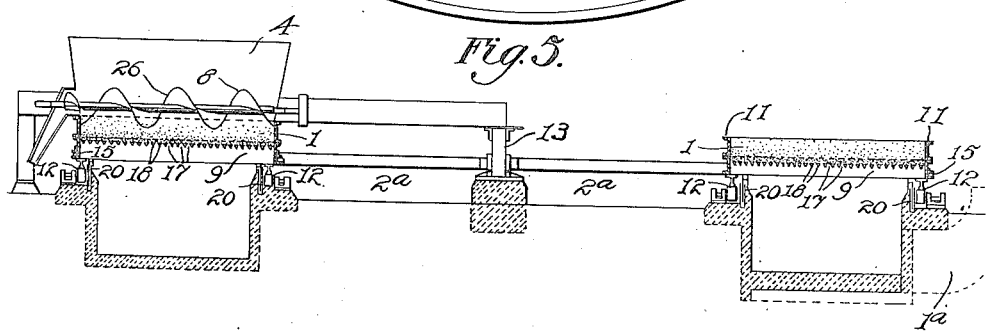

UNITED STATES PATENT OFFICE.

NIELS C. CHRISTENSEN, JR., OF SALT LAKE CITY, UTAH, ASSIGNOR, BY MESNE ASSIGNMENTS, TO HOLT-CHRISTENSEN PROCESS COMPANY, OF SALT LAKE CITY, UTAH, A CORPORATION OF UTAH.

PROCESS FOR TREATING ORES.

1,239,157.   Specification of Letters Patent.   Patented Sept. 4, 1917.

Application filed March 10, 1915. Serial No. 13,417.

*To all whom it may concern:*

Be it known that I, NIELS C. CHRISTENSEN, Jr., citizen of the United States, residing at Salt Lake City, Utah, have invented certain new and useful Improvements in Processes for Treating Ores, of which the following is a specification.

This invention relates to certain new and useful improvements in the process of and apparatus for treating ores and the like, and more especially the process and apparatus described in U. S. Patent #1,075,011, said improvements having been developed in the operation of the process at the Knight-Christensen mill at Silver City, Utah.

These improvements contemplate the treatment of the ore in such a way that each step of the process so intimately relates to all the others that they mutually coöperate to bring about a high chemical efficiency, a minimum loss of chemicals, a very short time of treatment, a very efficient utilization of the heat used in the process and the best possible physical and chemical conditions in each of the separate steps of the process.

The detailed improvements here described are of great importance in the commercial operation of the process.

The main steps of the process as described in the above patent are:

1—Grinding of the ore and chemicals to the required size.

2—Intimately and uniformly mixing the ore and chemicals and uniformly moistening the mixture with barren mill solution.

3—Establishing a uniform bed of the moistened mixture.

4—Roasting the ore bed by igniting the same and passing a current of air through the bed thus oxidizing the sulfids in the mixture, and chloridizing the ore.

5—Cooling the ore by the continued passage of air through the ore bed.

6—Condensing the acid fumes from the roast in the barren mill solution.

7—Adding chlorin to the mill solution if the ore contains gold.

8—Leaching the gold, silver, copper, and lead out of the ore with this acid mill solution.

9—Precipitating the metals from the pregnant mill solution and using the mill solution over again as described above.

These are as above noted, the main steps of the process but constant experimentation has established the improvements on each of these steps necessary to the best commercial operation of the process, and these are herein described.

The fineness to which the ore must be crushed in order to secure the extraction yielding the highest returns or commercial operation must be carefully determined for each ore. If this crushing is not comparatively fine, the sulfids and salt should be ground separate from the ore to a fine condition preferably finer than 30 mesh. This is important for the following reasons:

1—The finer the grinding of the salt the less necessary to effect the chloridizing.

2—The finer the sulfids, down to approximately 100 mesh, the less necessary to effect the chloridizing and to maintain the roast and the more uniform and better the roast.

3—The finer the sulfids, down to approximately 100 mesh the easier the ignition.

4—If the sulfids are coarse, the larger the amount necessary to effect chloridizing and to maintain the roast, the more difficult the ignition, and the greater the danger of sintering portions of the charge, also much of the coarser sulfid material is not thoroughly oxidized and may cause reciprocation in the leaching process and does not give any extraction of the metals held by it.

The intimate and uniform mixture of the chemicals (the salt and sulfids) with the ore is important as the more intimate and uniform the mixture the less of these materials required, the easier the ignition and more efficient the roast. The intimate and uniform moistening of the mixture with barren mill solution is of great importance for the following reasons:

1—Without moistening the mixture it is impossible to roast it by the methods described. The more uniformly the moisture is incorporated with the mixture the better the roasting and chloridizing, the more easily is the roasting operation carried out, and the better the product for leaching. The mixing and moistening is carried out in a special mixing apparatus forming the subject of a separate application, which delivers a very uniform product practically free from lumps and very light and porous.

The chloridizing roasting is carried on in a special type of apparatus, shown in the appended drawings, similar to the roaster described in U. S. Patent #1,075,011, but modified in some essential details and with improvements in each feature of operation.

In these drawings:

Figure 1 is a plan view of the roaster with parts of grate removed to show frame work etc.

Fig. 2 is a transverse section on line 2—2 of Fig. 1.

Fig. 4 is a plan, and

Fig. 5 is a transverse sectional view similar to Figs. 1 and 2 illustrating a different form of apparatus.

Figure 3:
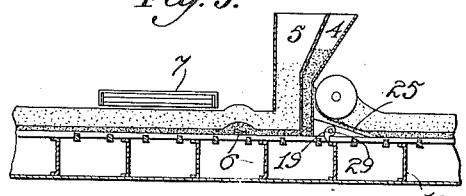
Fig. 3 is a section on line 3—3 of Fig. 1.

The same numbers refer to the same parts on all the figures. As shown in the drawings, the essential parts of the roaster consist of a revolving annular hearth 1 beneath which is a suction chamber 2 and $2^a$ from which the gases are drawn through the passage, 3 and $3^a$, by a suction fan and sent to the condensing towers, not shown, the gravel or coarse ore feed hopper 4, the moistened ore feed hopper 5, the loosening plow 6, the igniting device 7, the discharge device 25, 26 and the cleaning device 29. In the construction shown in Figs. 1, 2 and 3, the suction chamber is divided into compartments. In the form shown in Figs. 4 and 5 it is continuous and stationary.

The annular hearth 1 consists of a perforated grate 9, preferably of cast iron supported on the beams 10, and held together by the rims 11. The hearth revolves on the wheels or balls 12, and is tied to the central pivot 13 by the frame or spider 14, and is driven by means of the rope drive 15, Figs. 4 and 5, or annular rack 16, Figs. 1 and 2.

Figure 8:
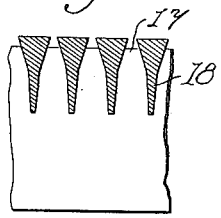
Fig. 8 is a sectional detail.
Figure 7:
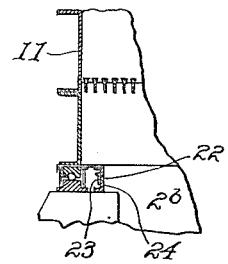
Fig. 7 is a sectional detail of a modification showing modified sealing means.

The perforated grate consists of a series of annular slots 17 between the cast iron grate bars 18 (see Fig. 8). The grate is made in this manner so that the cleaning fingers 19 carried on rock shaft 29 may be carried to project into the slots in the grate and prevent clogging or binding of the grates, which has been the greatest difficulty in this method of roasting.

The suction chamber 2 may revolve with the grate as shown in Figs. 1 and 2, in which event it is divided into compartments 32 formed by the rims 11 and beams 10, each space between the beams being a separate chamber which connects with the stationary pipe 3 by continuations of the compartments, the ends of which continuations connect with the openings $33^a$ in the ring 33 located beneath the lower end of pipe 3 and in axial alinement therewith. Any suitable packing means may be used to effect a tight joint between the pipe 3 and ring 33. It is desirable to interrupt or cut off the suction from the portion of the grate passing through the feed and ore removal zones and to accomplish this, I provide a sliding shoe or grate 34 curved to conform to the interior of the ring 33, and covering a portion of the ports $32^a$. This shoe is pivotally supported from a lever 35 hinged to a lug 36 on the inside of pipe 3, and the shoe is pressed against the inner face of ring 33 by tension means such as rod 37 and spring 38.

Figure 6:
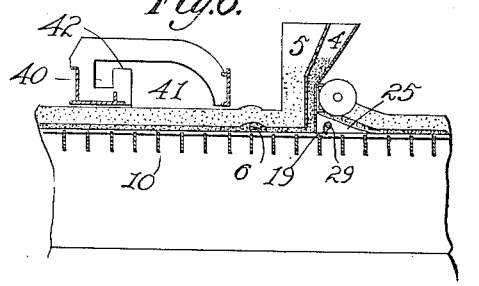
Fig. 6 is a sectional detail illustrating one form of heater.

If desired, however, I may provide a single stationary suction chamber $2^a$, closed from the outside space by the liquid seals 20, Figs. 4 and 5, in which event the suction pipe ($3^a$) indicated at $1^a$ communicates directly with chamber. The seal 20 may be filled with water, mercury, or any other suitable fluid. Instead of a liquid seal as shown at 20 I may use a sliding mechanical seal as indicated in Fig. 6 in which the narrow slot 22 is closed by the small flexible apron 23 which is held against the surface 24 by the suction on the inside of the chamber $2^a$ which the fan produces. This stationary suction chamber does not extend under the feed or removal zones, a seal being provided at the ends of the chamber.

The feed hopper 4 is kept partially filled with gravel or small balls of roasted ore screened out of the roasted ore discharged from the roaster, so that it discharges a uniform layer of the required thickness. The ore feed hopper 5 discharges a uniform layer of the moistened ore upon the layer of gravel supplied from hopper 4. The loosening plow 6 consists of a triangular bar held in place across the hearth below the surface of the gravel layer, so that the moistened ore is loosened in passing over it as the hearth revolves. The igniting device 7 shown in Figs. 1 and 3 is an electric starter and in Fig. 4 an oil or gas starter is shown, the operation of which is later described.

The discharge device consists of a plow 25 to lift the ore and the screw conveyer 26 to carry it to the outside and discharge it. The front edge of the plow is set practically upon the surface of the grate so that the gravel is removed and screened and returned to the hopper 4 so that the grate has a clean gravel bed upon it at all times.

The method of operation is as follows:

A uniform layer of gravel or coarser lumps of roasted ore from one to two inches thick is fed constantly from the hopper 4 on to the slotted grate 9. This layer is necessary to distribute the suction from the slots 17, to prevent blinding the grates and to loosen the layer of moistened ore as later described and is of great importance in the operation of the roaster. It also protects the grates somewhat, but this is of relatively smaller importance as compared with the other features. On top of this layer of roasted ore or gravel a uniform bed of ore is fed from the hopper 5. This bed is uniformly loosened by passing over the stationary plow 6 as the hearth or grate rotates. The plow is placed in the layer of roasted ore or gravel which is necessary to prevent blinding the grate. The plow 6 is an important feature as without this loosening a very high suction would be required to pull the air through the bed of ore, the difficulty of ignition would be greatly increased and the speed of the roast reduced. The layer of moistened ore then passes under the starting device 7 where the sulfids in the upper layers of ore are ignited and enough heat stored in the upper part of the charge to continue the roast through the rest of the charge. It is very important that the ignition and storing of the heat be properly carried out as the continuance and efficiency of the roast depends upon this feature. The amount of sulfid in the mixture must be relatively small in order to avoid fusing the ore which would entirely destroy the chloridizing effect of the roast and prevent a good extraction in the leaching process. The speed of the roast is high in order to secure a large capacity on the roaster and this further reduces the amount of sulfid which may be used, so that the amount used is approximately that necessary to bring about an efficient and chloridizing effect and generate the acids necessary in the process, the amount necessary for chemical purposes and fuel being approximately equal.

The small amount of fuel in the ore makes it necessary that the upper part of the charge be heated for a longer time than is necessary in sintering so that sufficient heat is stored in the upper layers to continue the roast. This heat must be uniformly distributed over the surface of the charge and for the same length of time in all parts and the temperature kept constant in order to secure efficient ignition. The temperature must also be kept low enough so that the surface of the charge is not fused. The ignition and roasting problem in this case is an entirely different one to that in sintering a charge containing a large amount of sulfid. In order to bring about these desired results the ignition or starting device is made relatively long in the direction of travel of the ore and of such a shape that all parts of the surface of the charge are heated for the same length of time. The combustion chamber 40 in the form shown in Fig. 6 is separated from the ignition chamber 41 and the volume of hot gases passing from this chamber to the ignition chamber at any point across the hearth is regulated by the height of the passage 42 so that the temperature of the ignition chamber is uniform across the hearth.

The ignition may also be carried out by means of an electric ignition device 7 shown in Figs. 1 and 3, in which the heat for ignition is generated by the passage of an electric current through a suitable high temperature resistance above the ore, this resistance being so arranged that all parts of the surface of the charge are heated at the proper temperature and for the proper length of time to secure the most efficient ignition. One great advantage of this starter is that the air drawn through the ore bed under the ignition device is as highly oxidizing as possible as none of the oxygen has been consumed. In the case of the oil or gas starter the amount of air supplied should be regulated so that the gases be sufficiently oxidizing to thoroughly ignite the sulfids on the surface of the charge. After ignition the roast is continued by the passage of a current of air down through the charge. The suction is so regulated that the time to complete the roast on a four inch layer is approximately from 20 to 30 minutes. The suction required will vary with the size to which the ore has been crushed, the finer the crushing the stronger the suction necessary to draw the required current of air through the bed. The thickness of the bed which may advantageously be used will vary with the fineness of the ore, the coarser the ore the thicker the bed should be, from the standpoint of both efficiency and economy.

By the time the roaster carries the ore from the igniter to the discharge the roast is completed. No further cooling is necessary as the top layers are relatively cold and the ore discharged from the roaster relatively hot is carried to the leaching department in this condition. The complete and special cooling mentioned in the description in U. S. Patent #1,075,011 is not carried out as it is unnecessary and it has been found a decided advantage to pass the ore into the leaching solution in a heated condition as the extraction is much more rapid and perfect. This feature has been found to be of considerable importance in the commercial operation of the process.

The acid fumes are drawn from the roasting ore through the suction chamber 2 and passage 3 by a fan and forced through a suitable condensing tower in which the barren mill solution circulates and condenses the acids and the very small amount of volatilized metals in the roaster gases. If a comparatively strong acid solution is desired, it is necessary to circulate the solution through the tower a number of times.

The warm acid solution thus formed in the condensing tower is used in leaching the hot ore from the roaster. If the ore contains much gold, however, it is necesary to add some chlorin to bring the gold into solution. This may be done by adding bleaching powder or permanganate or by introducing chlorin secured from special cells or from the lead precipitating department as mentioned later.

This mill solution dissolves the gold, silver, copper and lead in the roasted ore very readily and but very small quantities of iron, giving a comparatively clean solution for precipitation.

The pregnant mill solution from the leaching department passes to the precipitation department where the metals are precipitated together or separately as may be desired in the particular case in question. The gold, silver, and copper may be readily and quickly precipitated upon iron and this precipitate shipped to a smelter or refinery.

The precipitation of the lead upon iron is more difficult as the precipitation is very slow as compared with the other metals and requires a much larger precipitating department. The silver and gold may be precipitated upon copper and the copper upon iron in order to secure separate products. Both of these methods have been used at the Silver City plant of the Knight-Christensen Co. The following method which has many advantages may be used:

The gold and silver are precipitated upon copper from the copper precipitating department, the copper is precipitated upon lead from the lead precipitating department and the lead precipitated on suitable cells by electrolysis. Part of the chlorin generated in these cells is used to chlorinate the mill solution so as to dissolve the gold and the remainder is sent to the condensing tower so as to continually replenish the acid in the solution by reacting with the $SO_2$ and water as follows:

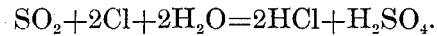
$$SO_2 + 2Cl + 2H_2O = 2HCl + H_2SO_4.$$

This scheme of precipitation has the following advantages:

All the metals are precipitated separately so that a maximum price is secured for them; no precipitants are lost as they are formed and recovered in the process; the main cost of precipitation is the electricity used in the lead precipitating department; the chlorin is necessary to the recovery of any gold in the ore and if no gold is present constantly replenishes the acid and the solution, a portion of the barren solution from the precipitating department is used in moistening the ore before roasting and the remainder returned to the condensing towers and passes through the same cycle again.

By means of the process as above outlined it has been found possible to treat very low grade ores profitably. As is readily seen from the above description the remarkable efficiency and economy of the process are due to the fact that all steps of the process are so intimately related that each one coöperates with all the others to bring about the best possible results with the highest conservation of the chemicals and the heat and electrical energy used. This will appear from the following brief synopsis:

The fine grinding of the chemicals, the salt and sulfids, gives a very intimate mixture with the ore which results in the maximum chloridizing effect in the roast, the maximum production of acid for leaching, and the maximum of heat required for ignition, besides the minimum of chemicals used. The moistening of the ore with barren mill solution, gives a very intimate contact of the chloridizers with the minerals of the ore, which result in a very efficient chloridizing in the roast, regenerates the acids locked in some of the salts by decomposition in the roast, makes possible an efficient roast, continually withdraws the barren solution from the circuit without loss of chemicals, thus making possible the use of wash solution without the accumulating of an excess of solution, and also preventing fouling of the solution, it prevents dust in the roasting, and makes an ideal product for leaching. The roasting of the moistened ore by the method used gives a very efficient chloridizing effect due to the intimate contact of the gases with the ore particles and the generation of the heat and acid in the body of the charge, utilizes the sulfids both as a fuel and as a chemical to assist in chloridizing and furnishing acid for leaching, uses a minimum of fuel for the roasting process, delivers the roasted gases to the condensing towers practically free from dust and with the minimum volume of gas necessary to roast the charge, which makes the condensation of the acid easy, delivers the roasted ore at the temperature best suited for efficient leaching, and delivers an ideal product for leaching. The condensation of the acid fumes from the roaster gives the acid for leaching at practically no cost, heats the mill solution thus giving more rapid and efficient action in dissolving out the metals, and prevents any slight losses by volatilization. The leaching of the hot ore with the warm mill solution results in high extractions and large capacity due to the rapidity of the chemical action and makes the leaching mechanically efficient due to the small amount and rapid settlement of the slimes and rapid flow or percolation of the solution. The precipitation of the metals is very rapid and complete due to the hot solution coming from the leaching department and of the metals being precipitated separately and with the lead precipitated by electrolysis no precipitants are consumed and lost and the chlorin generated is utilized to make acid for leaching and to dissolve the gold. As noted each step is intimately related to the others so as to bring about the highest efficiency at the lowest cost.

Having thus described my invention what I claim and desire to secure by Letters Patent, is:

1. In the process of roasting ore, the steps which consist in screening out the coarser particles, and gravel from the roasted ore, spreading a portion of said particles in a uniform bed upon the roaster grate, spreading a moistened mixture of ore and salt and sulfids in a uniform layer upon the above mentioned bed of coarse particles; loosening the layer of moistened ore by disturbing the bed of screened material, heating the upper portions of said moistened layer of one and igniting the sulfids therein, and roasting said layer by passing a current of air down through it, discharging the roasted mixture and aforementioned coarse bed, screening the coarser particles out of said roasted ore and coarse bed and using a portion of said coarse screenings to make a fresh coarse bed.

2. In the process of roasting, the steps which consists in moistening the mixture of crushed ore and salt and sulfids, continuously spreading a portion of the gravel and coarser particles screened from the roasted ore in a uniform bed upon the roaster grate, continuously spreading a moistened mixture of ore and salt and sulfids in a uniform layer upon said bed of coarse particles, continuously loosening the last mentioned layer of moistened ore by disturbing said bed of screened material, continuously heating the upper portions of said moistened layer for a short time after said layer has been loosened and igniting the sulfids therein, and roasting said layer by continuously passing a current of air down through it, discharging the roasted mixture and aforementioned coarse bed, screening the coarser particles out of said roasted ore and coarse bed, and using a portion of coarse screenings to make a fresh coarse bed.

In testimony whereof I affix my signature in presence of two witnesses.

NIELS C. CHRISTENSEN, Jr.

Witnesses:
G. L. Davis,
Norman E. Dahle.